(12) United States Patent  (10) Patent No.: US 7,599,268 B2
Nagaoka  (45) Date of Patent: Oct. 6, 2009

(54) OPTICAL DISC RECORDING/REPRODUCING APPARATUS

(75) Inventor: Toshiyuki Nagaoka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 577 days.

(21) Appl. No.: 11/526,712

(22) Filed: Sep. 26, 2006

(65) Prior Publication Data

US 2007/0070862 A1    Mar. 29, 2007

(30) Foreign Application Priority Data

Sep. 27, 2005    (JP) ............................. 2005-279815

(51) Int. Cl.
    *G11B 7/00*    (2006.01)
(52) U.S. Cl. .................................. 369/47.53
(58) Field of Classification Search .................. None
    See application file for complete search history.

(56) References Cited

U.S. PATENT DOCUMENTS

2002/0003760 A1 *  1/2002  Honda ..................... 369/47.52
2002/0064109 A1 *  5/2002  Shimoda et al. .......... 369/47.53
2002/0110064 A1 *  8/2002  Yen et al. ................. 369/47.53
2005/0207299 A1 *  9/2005  Yamaguchi et al. ...... 369/47.53

FOREIGN PATENT DOCUMENTS

| JP | A-02-018714 | 1/1990 |
| JP | A-04-216322 | 8/1992 |
| JP | A-08-221949 | 8/1996 |
| JP | A-09-035466 | 2/1997 |
| JP | A-2001-350596 | 12/2001 |

\* cited by examiner

*Primary Examiner*—Peter Vincent Agustin
(74) *Attorney, Agent, or Firm*—Morgan Lewis & Bockius LLP

(57) ABSTRACT

After OPC is executed on a DVD+RW, a value of an OPC counter assigned to a DCB of the DVD+RW is read and then temporarily saved in a memory, and then the temporarily saved value is incremented by +1. If an optical disc eject request is received, the value of the OPC counter assigned to the DCB is updated so as to be equal to the incremented value. If a write-operation-number display instruction is received, the value of the OPC counter assigned to the DCB is read and then displayed by display means as the number of write operations to the disc.

5 Claims, 7 Drawing Sheets

FIG. 2

| | Description | Nominal radius in mm | PSN(h) of the first physical sector (mm) | Number of physical sectors |
|---|---|---|---|---|
| | Initial Zone | start 22.000 mm | 01D830 | 52,304 (nominal) |
| Lead-in | Inner Disc Test Zone | start 23.400 mm | 02A480 | 2,048 |
| | Inner Drive Test Zone | | 02AC80 | 12,288 |
| | Guard Zone 1 | | 02DC80 | 512 |
| | Reserved Zone 1 | start 23.782 mm | 02DE80 | 4,096 |
| | Reserved Zone 2 | start 23.886 mm | 02EE80 | 64 |
| | Inner Disc Identification Zone | | 02EEC0 | 256 |
| | Reserved Zone 3 | | 02EFC0 | 64 |
| | Reference Code Zone | start 23.896 mm | 02F000 | 32 |
| | Buffer Zone 1 | | 02F020 | 480 |
| | Control Data Zone | | 02F200 | 3,072 |
| | Buffer Zone 2 | | 02FE00 | 512 |
| Data | Data Zone | start 24.000 mm | 030000 | 2,295,104 |
| Lead-out | Buffer Zone 3 | start 58.000 mm | 260540 | 768 |
| | Outer Disc Identification Zone | | 260840 | 256 |
| | Guard Zone 2 | | 260940 | 4,096 |
| | Reserved Zone 4 | start 58.053 mm | 261940 | 4,096 |
| | Outer Drive Test Zone | | 262940 | 12,288 |
| | Outer Disc Test Zone | | 265940 | 2,048 |
| | Guard Zone 3 | start 58.246 mm end >= 58.500 | 266140 | 24,400 (nominal) |

FIG. 3

| | | |
|---|---|---|
| Physical Sector 173 183 | Initial Zone<br>all Physical Sectors<br>with Main Data set to (00) | Physical Sector 02A47F |
| Physical Sector 173 184 | Inner Disc Test Zone<br>2,048 Physical Sectors | Physical Sector 02A480 |
| Physical Sector 175 231 | | Physical Sector 02AC7F |
| Physical Sector 175 232 | Inner Drive Test Zone<br>12,288 Physical Sectors | Physical Sector 02AC80 |
| Physical Sector 187 519 | | Physical Sector 02DC7F |
| Physical Sector 187 520 | Guard Zone 1<br>512 Physical Sectors<br>with Main Data set to (00) | Physical Sector 02DC80 |
| Physical Sector 188 031 | | Physical Sector 02DE7F |
| Physical Sector 188 032 | Reserved Zone 1<br>4,096 Physical Sectors | Physical Sector 02DE80 |
| Physical Sector 192 127 | | Physical Sector 02EE7F |
| Physical Sector 192 128 | Reserved Zone 2<br>64 Physical Sectors | Physical Sector 02EE80 |
| Physical Sector 192 191 | | Physical Sector 02EEBF |
| Physical Sector 192 192 | Inner Disc Identification Zone<br>256 Physical Sectors | Physical Sector 02EEC0 |
| Physical Sector 192 447 | | Physical Sector 02EFBF |
| Physical Sector 192 448 | Reserved Zone 3<br>64 Physical Sectors | Physical Sector 02EFC0 |
| Physical Sector 192 511 | | Physical Sector 02EFFF |
| Physical Sector 192 512 | Reference Code Zone<br>32 Physical Sectors | Physical Sector 02F000 |
| Physical Sector 192 543 | | Physical Sector 02F01F |
| Physical Sector 192 544 | Buffer Zone 1<br>480 Physical Sectors<br>with Main Data set to (00) | Physical Sector 02F020 |
| Physical Sector 193 023 | | Physical Sector 02F1FF |
| Physical Sector 193 024 | Control Data Zone<br>3,072 Physical Sectors | Physical Sector 02F200 |
| Physical Sector 196 095 | | Physical Sector 02FDFF |
| Physical Sector 196 096 | Buffer Zone 2<br>512 Physical Sectors<br>with Main Data set to (00) | Physical Sector 02FE00 |
| Physical Sector 196 607 | | Physical Sector 02FFFF |
| Physical Sector 196 608 | Data Zone | Physical Sector 030000 |

Lead-in

FIG. 4

| Physical Sector of ECC block | Main Data byte position | Description | Number of bytes |
|---|---|---|---|
| 0 | D0 to D3 | Content Descriptor | 4 |
| 0 | D4 to D7 | Unknown Content Descriptor Actions | 4 |
| 0 | D8 to D39 | Drive ID | 32 |
| 0 | D40 to D43 | FDCB update count | 4 |
| 0 | D44 to D47 | Formatting status and mode | 4 |
| 0 | D48 to D51 | Last written address | 4 |
| 0 | D52 to D55 | Last written address | 4 |
| 0 | D56 to D59 | Bitmap Start Address | 4 |
| 0 | D60 to D63 | Bitmap Length | 4 |
| 0 | D64 to D95 | Disc ID | 32 |
| 0 | D96 to D127 | Application dependent | 32 |
| 0 | D128 to D191 | List of DCBs | 16x4 |
| 0 | D192 to D2047 | Reserved and set to (00) | 1856 |
| 1 to 9 | D0 to D2047 | Formatting bitmap | 9x2,048 |
| 10 to 15 | D0 to D2047 | Reserved and set to (00) | 6x2,048 |

The OPC counter is arranged in the hatched area.

FIG. 5

| Byte position | Description |
|---|---|
| 0 | |
| 1 | |
| 2 | |
| 3 | |
| ⋮ | |
| 192 | OPC counter |
| 193 | OPC counter |
| ⋮ | |

OPTICAL DISC RECORDING/REPRODUCING APPARATUS

This application is based on Japanese Patent Application No. 2005-279815 filed on Sep. 27, 2005, the contents of which are hereby incorporated by reference.

BACKGROUND OF THE INVENTION

1. Field of the Invention

The present invention relates to an optical disc recording/reproducing apparatus that records and reproduces information on and from an optical disc. More particularly, the present invention relates to an optical disc recording/reproducing apparatus capable of displaying the number of times writing has been performed to a DVD+RW optical disc.

2. Description of Related Art

In recent years, DVDs (digital versatile discs), which are optical discs that can record information such as a large amount of video/audio data like that of movies, have been increasingly widespread. As these DVDs, various types are known such as a DVD–ROM containing information that is pre-recorded by a manufacturer and cannot be rewritten by a user, a DVD–R or a DVD+R that allows the user to record information thereon only once, and a DVD–RW, a DVD+RW, or a DVD–RAM that allows the user to rewrite information thereon a specified number of times. Information recorded on these DVDs can be reproduced by optical disc reproducing apparatuses (DVD players) or optical disc recording/reproducing apparatuses (DVD recorders), and information can be recorded on a DVD–R, a DVD+R, a DVD–RW, a DVD+RW, and a DVD–RAM by using optical disc recording/reproducing apparatuses.

Incidentally, if information of a rewritable optical disc such as a DVD–RW, a DVD+RW, or a DVD–RAM is rewritten over and over again, residual components are increased due to various causes such as deterioration in characteristics of medium materials themselves or tracking deviation, resulting in degradation of recording quality. In the aforementioned rewritable optical disc, a phase change recording method is adopted that exploits transformation between an amorphous state and a crystalline state. Thus, deterioration in characteristics of materials themselves inevitably sets a limit on the number of times the disc can be rewritten. If the users carry out rewrite operation without knowing they are violating the limit or approaching it, an S/N ratio of a sector to which writing has been performed deteriorates greatly, or crosstalk into the adjacent tracks increases. This undesirably degrades recording quality.

To solve this problem, a conventional optical disc recording/reproducing apparatus is proposed that simply measures, for example, an error rate of a loaded optical disc and causes a display device to display the error rate thus measured. However, the number of times a rewritable optical disc has been rewritten is not displayed thereon, making it impossible for the user to know how long a medium lasts or when it needs replacing. This causes inconvenience for the user.

Another conventional technique disclosed in JP-A-H02-018714 records the number of times an optical disc has been rewritten, and, if the number thus recorded exceeds a specified number, lights an indication lamp. However, this technique does not inform how long a medium lasts or when it needs replacing by displaying the number of times a rewritable optical disc has been rewritten.

Still another conventional technique disclosed in JP-A-H04-216322 records the number of times a sector on an optical disc has been rewritten, then compares the number thus recorded with a specified number and then, if the former exceeds the latter, performs recording in another sector. However, this conventional technique also does not inform how long a medium lasts or when it needs replacing by displaying the number of times a rewritable optical disc has been rewritten.

Still another conventional technique disclosed in JP-A-2001-350596 records the number of times writing has been performed to a recording apparatus, and, if the number thus recorded exceeds a specified value, produces a signal. However, this recording apparatus is a hard disk device. Thus, this conventional technique does not inform how long a medium lasts or when it needs replacing by displaying the number of times a rewritable optical disc has been rewritten.

Still another conventional technique disclosed in JP-A-H09-035466 keeps count of the number of recording operations on a tape, and, if the number thus counted exceeds a limit value, generates an alarm. However, this conventional technique does not inform how long a medium lasts or when it needs replacing by displaying the number of times a rewritable optical disc has been rewritten.

Still another conventional technique disclosed in JP-A-H08-221949 keeps count of the number of times data has been written to or deleted from a magneto-optical disc, and, if the number thus counted exceeds a predetermined value, generates an alarm. However, this conventional technique does not inform how long a medium lasts or when it needs replacing by displaying the number of times a rewritable optical disc has been rewritten.

In view of the conventionally experienced problems described above, it is an object of the present invention to provide an optical disc recording/reproducing apparatus that can inform the user how long a medium (optical disc) lasts or when it needs replacing by displaying the number of times writing has been performed to a rewritable optical disc (especially a DVD+RW optical disc).

SUMMARY OF THE INVENTION

To achieve the above object, according to the present invention, an optical disc recording/reproducing apparatus is provided with a system controller that, after executing OPC (optimized power control) for setting output laser light of an optical pickup to the optimum power, updates a value of an OPC counter assigned to a predetermined area of the optical disc by incrementing the value of the OPC counter by 1, and, if a write-operation-number display instruction is received when information is being read from the optical disc, causes display means to display the updated OPC counter value as a number of times writing has been performed to the optical disc.

With this configuration, it is possible to display the number of times writing has been performed to a rewritable optical disc (especially a DVD+RW optical disc), making it possible to inform the user how long the optical disc lasts or when it needs replacing. That is, by displaying on a display device or the like the number of times writing has been performed to a currently used optical disc, it is possible to inform the user how long the optical disc lasts or when it needs replacing. This offers convenience for the user, and helps reduce writing error.

BRIEF DESCRIPTION OF THE DRAWINGS

FIG. 2 is a table showing the layout of the information zone of a DVD+RW in this embodiment;

FIG. 3 is a table showing the number of physical sectors of different zones of the lead-in zone shown in FIG. 2;

FIG. 4 is a table showing physical sectors of the inner disc identification zone shown in FIG. 2 or 3, and positions, descriptions, and number of bytes of main data thereof;

FIG. 5 is a table showing a position in the inner disc identification zone shown in FIG. 2, 3, or 4 where information of an OPC counter is stored;

DETAILED DESCRIPTION OF PREFERRED EMBODIMENTS

Figure 1:
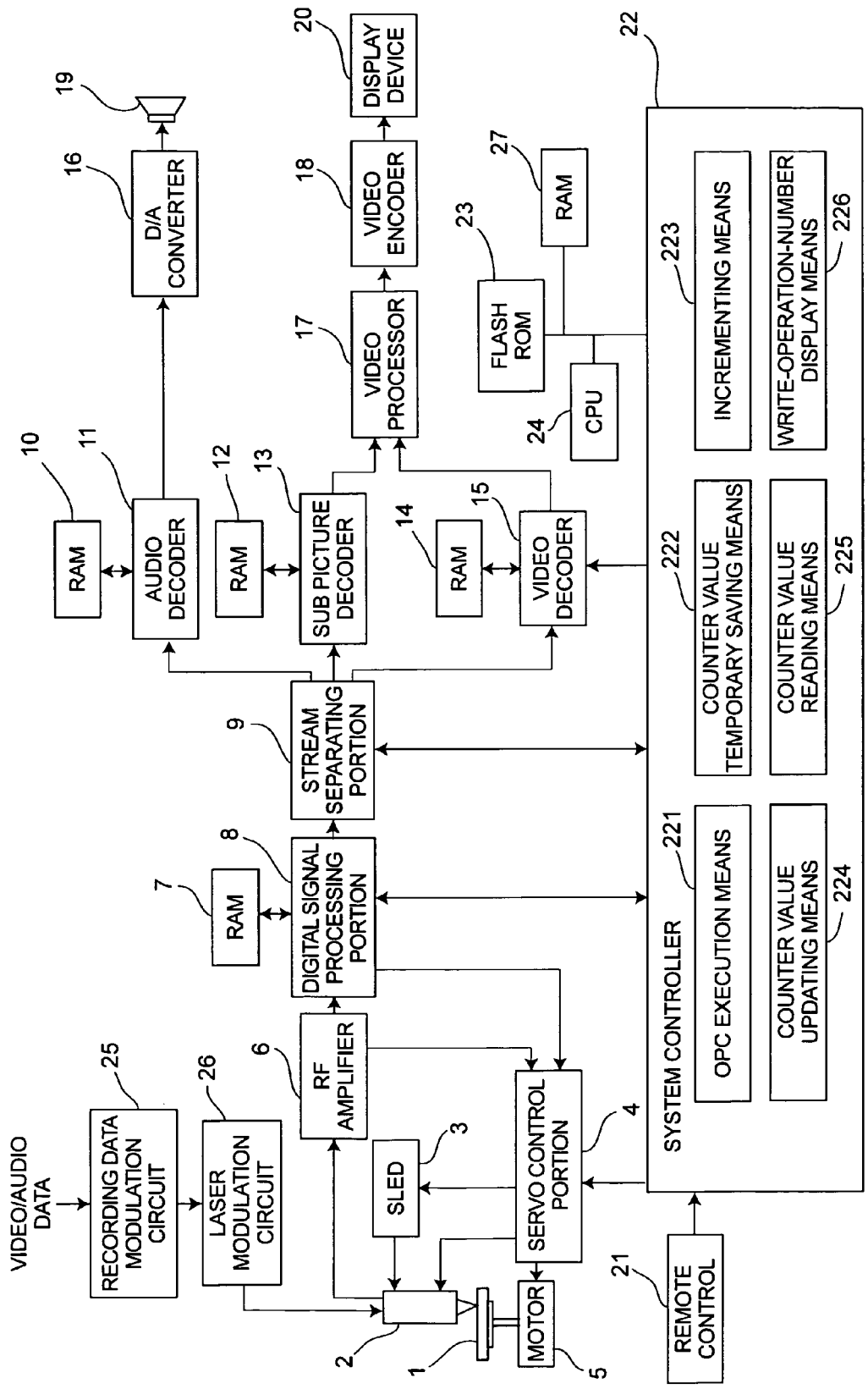
FIG. 1 is a block diagram showing the configuration of an optical disc recording/reproducing apparatus of one embodiment of the present invention.

Hereinafter, an embodiment of the present invention will be described with reference to the accompanying drawings. FIG. 1 is a block diagram showing the configuration of an optical disc recording/reproducing apparatus of one embodiment of the present invention.

This optical disc recording/reproducing apparatus has a spindle motor 5 that rotates an optical disc 1, an optical pickup 2 that emits laser light for recording and reproducing information on and from the optical disc 1 and receives light reflected from the optical disc 1, and a sled 3 that moves the optical pickup 2 in a radial direction of the optical disc 1. This optical disc recording/reproducing apparatus also has a servo control portion 4 that drives the spindle motor 5 and the sled 3 according to instructions from a system controller 22 and moves a focus position of laser light in vertical and horizontal directions relative to a recording plane of the optical disc 1 by moving an objective lens (not shown) built in the optical pickup 2. The servo control portion 4 also controls output laser power of the optical pickup 2.

The optical disc recording/reproducing apparatus also has an RF amplifier 6 that amplifies an RF signal, the read signal from the optical pickup 2, at the time of reproducing data from the optical disc 1, a digital signal processing portion 8 that converts the RF signal outputted from the RF amplifier 6 into digital data, then generates data by performing signal demodulation and ECC error correction to the digital data according to the data format of the optical disc 1, and then stores the resultant data in a RAM 7, and a stream separating portion 9 that separates audio data, subpicture data, and video data from the data stream outputted from the digital signal processing portion 8 according to instructions from the system controller 22.

The optical disc recording/reproducing apparatus also has an audio decoder 11 that receives audio data outputted from the stream separating portion 9 and then performs predetermined decoding, a RAM 10 that temporarily stores data for performing decoding in the audio decoder 11, a subpicture decoder 13 that receives subpicture data outputted from the stream separating portion 9 and then performs predetermined decoding, a RAM 12 that temporarily stores data for performing decoding in the subpicture decoder 13, a video decoder 15 that receives video data outputted from the stream separating portion 9 and then performs predetermined decoding, and a RAM 14 that temporarily stores data for performing decoding in the video decoder 15.

The optical disc recording/reproducing apparatus also has a video processor 17 that combines data outputted from the video MPEG decoder 15 with data outputted from the subpicture decoder 13 according to instructions from the system controller 22, a video encoder 18 that converts the combined data outputted from the video processor 17 into a video signal for display, and then makes a display device 20 display a corresponding image thereon, and a D/A converter 16 that converts data outputted from the audio decoder 11 into an analog audio signal, and then feeds the audio signal to, for example, a loudspeaker 19 via an unillustrated audio circuit.

The optical disc recording/reproducing apparatus also has a remote control 21 provided with various operation keys including a playback key, a record key, and a stop key for giving a playback instruction, a record instruction, and a record/playback stop instruction, respectively, to the system controller 22 with an infrared radiation signal, and a power supply key. In addition to the aforementioned functions, the system controller 22 controls the entire apparatus.

The optical disc recording/reproducing apparatus has a flash ROM 23 that stores a program or data for controlling individual components of the apparatus or the entire apparatus, a CPU 24 that performs arithmetic operations according to the program or data stored in the flash ROM 23 and controls the system controller 22, and a RAM 27 that temporarily stores data required for arithmetic operations performed by the CPU 24.

The optical disc recording/reproducing apparatus also has a recording data modulation circuit 25 that modulates video/audio data transmitted from an unillustrated television receiver, personal computer, or the like, to record it on the optical disc 1, and a laser modulation circuit 26 that outputs a laser modulation signal to the optical pickup 2 to modulate laser light based on the modulated data modulated by the recording data modulation circuit 25.

The system controller 22 includes, as features of this embodiment, OPC execution means 221, counter value temporary saving means 222, incrementing means 223, and counter value updating means 224. The OPC execution means 221 executes, if the optical disc 1 is found to be a DVD+RW, OPC (optimized power control) for setting the power of the output laser light of the optical pickup 2 to the optimum power. The counter value temporary saving means 222 temporarily saves in the RAM 27 a value of an OPC counter assigned to a DCB (disc control block) in an inner disc identification zone of the optical disc 1 if it is a DVD+RW. The incrementing means 223 increments the OPC counter value temporarily saved in the RAM 27 by +1 in order to count the number of executions of the OPC. After the OPC counter value temporarily saved in the RAM 27 is incremented by +1, recording of information on the optical disc 1 is started. Then, if an optical disc eject request is received when recording of information is stopped, the counter value updating means 224 provided in the system controller 22 updates the value of the OPC counter assigned to the DCB so as to be equal to the incremented OPC counter value saved in the RAM 27.

The system controller 22 also includes counter value reading means 225 for reading, if a write-operation-number display instruction is given and the loaded optical disc 1 is found to be a DVD+RW, the value of the OPC counter assigned to the DCB, and write-operation-number display means 226 for causing the display device 20 or an apparatus main display portion (not shown) to display the read OPC counter value as the number of write operations to the disc.

FIG. 2 is a table showing the layout of the information zone of a DVD+RW in this embodiment. In FIG. 2, "description" represents a description of each zone, "nominal radius (mm)" represents the radius of the disc at which each zone is started, "PSN (physical sector number) of the first physical sector (h)" represents an address of the first physical sector of each zone, and "number of physical sectors" represents the number of physical sectors of each zone.

A lead-in zone consists of an initial zone, an inner disc test zone, an inner drive test zone, a guard zone 1, a reserved zone 1, a reserved zone 2, an inner disc identification zone, a reserved zone 3, a reference code zone, a buffer zone 1, a control data zone, and a buffer zone 2. A data zone consists of a data zone. A lead-out zone consists of a buffer zone 3, an outer disc identification zone, a guard zone 2, a reserved zone 4, an outer drive test zone, an outer disc test zone, and a guard zone 3. Among these zones, attention should be paid to, as a feature of this embodiment, the inner disc identification zone because the OPC counter is assigned thereto.

FIG. 3 is a table showing the number of physical sectors of different zones of the above-described lead-in zone. As shown in FIG. 3, in the initial zone, all physical sectors have main data set to (00 h). The inner disc test zone has 2048 physical sectors, and the inner drive test zone has 12288 physical sectors. The guard zone 1 has 512 physical sectors with main data set to (00 h). The reserved zone 1 has 4096 physical sectors, and the reserved zone 2 has 64 physical sectors. The inner disc identification zone has 256 physical sectors, and the reserved zone 3 has 64 physical sectors. The reference code zone has 32 physical sectors. The buffer zone 1 has 480 physical sectors with main data set to (00 h). The control data zone has 3072 physical sectors. The buffer zone 2 has 512 physical sectors with main data set to (00 h).

FIG. 4 is a table showing physical sectors of the inner disc identification zone, and positions, descriptions, and number of bytes of main data thereof. In FIG. 4, D0 to D3 of physical sector 0 is main data from 0th byte to 3rd byte, data of 4 bytes indicating a content descriptor. D4 to D7 of physical sector 0 is main data from 4th byte to 7th byte, data of 4 bytes indicating unknown content descriptor actions. D8 to D39 of physical sector 0 is main data from 8th byte to 39th byte, data of 32 bytes indicating a drive ID. D40 to D43 of physical sector 0 is main data from 40th byte to 43rd byte, data of 4 bytes indicating an FDCB update count. D44 to D47 of physical sector 0 is main data from 44th byte to 47th byte, data of 4 bytes indicating a formatting status and mode. D48 to D51 of physical sector 0 is main data from 48th byte to 51st byte, data of 4 bytes indicating a last written address.

D52 to D55 of physical sector 0 is main data from 52nd byte to 55th byte, data of 4 bytes indicating a last verified address. D56 to D59 of physical sector 0 is main data from 56th byte to 59th byte, data of 4 bytes indicating a bitmap start address. D60 to D63 of physical sector 0 is main data from 60th byte to 63rd byte, data of 4 bytes indicating a bitmap length. D64 to D95 of physical sector 0 is main data from 64th byte to 95th byte, data of 32 bytes indicating a disc ID.

D96 to D127 of physical sector 0 is main data from 96th byte to 127th byte, application dependent data of 32 bytes. D128 to D191 of physical sector 0 is main data from 128th byte to 191st byte, data of 64 bytes indicating a list of DCBs. D192 to D2047 of physical sector 0 is main data from 192nd byte to 2047th byte, data of 1856 bytes being reserved and set to (00 h). D0 to D2047 of physical sectors 1 to 9 is data of 9×2047 bytes indicating a formatting bitmap for nine sets of main data from 0th byte to 2047th byte. D0 to 2047 of physical sectors 10 to 15 is data of 6×2048 bytes being reserved and set to (00 h) for six sets of main data from 0th byte to 2047th byte.

In such an inner disc identification zone, 256 physical sectors are reserved for information agreed upon by the data interchange parties. Specifically, each set of 16 physical sectors from one ECC block is either a DCB (disc control block) or recorded with all (00 h) main data.

FIG. 5 is a table showing a position in the inner disc identification zone where information of an OPC counter is stored. As shown in FIG. 5, a value of the OPC counter is stored in 192nd byte and 193rd byte of the DCB. That is, in FIG. 4, among the bytes D192 to D2047 of physical sector 0, i.e., the 1856 bytes being reserved and set to (00 h), main data at byte D192 and byte D193 indicates an OPC counter. Needless to say, the position where information of the OPC counter is stored is not limited to this specific position. The information of the OPC counter may be stored in any other position in the inner disc identification zone.

Figure 6:
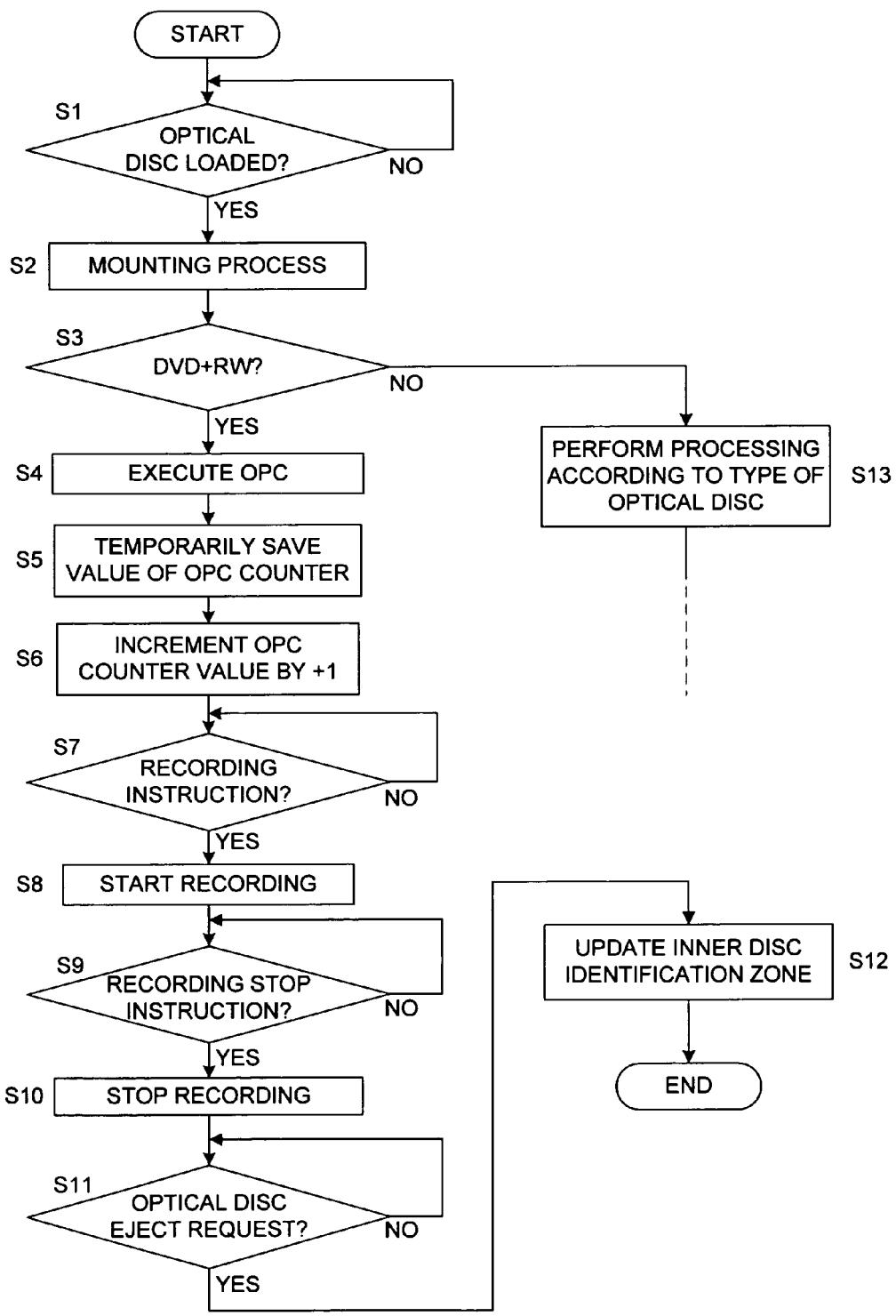
FIG. 6 is a flow chart showing how a value of the OPC counter is updated in the procedure performed to display the number of times writing has been performed to a DVD+RW.

FIG. 6 is a flow chart showing how a value of the OPC counter is updated in the procedure performed to display the number of times writing has been performed to a DVD+RW. With reference to this flow chart and FIGS. 1 to 5, how a value of the OPC counter is updated will be described.

First, the system controller 22 detects whether or not the optical disc 1 is loaded (step S1). If the optical disc 1 is found to be loaded, the system controller 22 slightly rotates the optical disc 1, and drives the optical pickup 2 for reading disc information from the control data zone (see FIG. 2) (step S2). This is so-called mount processing. Based on the read disc information, it is checked whether the optical disc 1 is a DVD+RW or not (step S3). If the optical disc 1 is found not to be a DVD+RW, processing according to the type of the optical disc 1 is performed (step S13). If the optical disc 1 is found to be a DVD+RW, the OPC execution means 221 of the system controller 22 executes, by controlling the servo control portion 4, the OPC for setting the power of the output laser light of the optical pickup 2 to the optimum power (step S4).

After the execution of the OPC, the counter value temporary saving means 222 of the system controller 22 reads a value of the OPC counter assigned to the DCB in the inner disc identification zone (see FIGS. 2 to 5) of the optical disc (DVD+RW) 1, and then temporarily saves it in the RAM 27 (step S5). The incrementing means 223 of the system controller 22 increments the OPC counter value temporarily saved in the RAM 27 by +1 (step S6). Assume that data has never been written to this DVD+RW. Then, the initial value of the OPC counter assigned to the DCB in the inner disc identification zone (see FIGS. 2 to 5) is "0". As a result of the OPC being executed on this DVD+RW for the first time, a value "1" is added to the OPC counter value "0" temporarily saved in the RAM 27, giving "1".

Then, a recording instruction is given by pressing a record key of the remote control 21, or at a preselected start time for programmed recording (step S7). In response to this, the system controller 22 rotates the spindle motor 5 by means of the servo control portion 4, thereby rotating the optical disc 1 and driving the optical pickup 2. At the same time, the system controller 22 drives the recording data modulation circuit 25 and the laser modulation circuit 26. In this way, recording of information on the optical disc (DVD+RW) 1 is started (step S8).

Next, a recording stop instruction is given by pressing a stop key of the remote control 21, or at a preselected end time for programmed recording (step S9). Then, the system controller 22 stops recording of information on the optical disc (DVD+RW) 1 (step S10). After recording of information is stopped, a tray open/close key of the remote control 21 is pressed to give an optical disc eject request (step S11). Upon receipt of this request, the counter value updating means 224 updates the value of the OPC counter assigned to the DCB in the inner disc identification zone so as to be equal to the OPC counter value temporarily saved in the RAM 27 (step S12).

For example, when information is written to the optical disc (DVD+RW) 1 for the first time, the value of the OPC counter assigned to the DCB in the inner disc identification zone becomes "1", indicating that the number of write operations is 1. If information is written again (rewritten) to the same optical disc (DVD+RW) 1, the value of the OPC counter assigned to the DCB in the inner disc identification zone becomes "2", indicating that the number of write operations is 2. Likewise, if information is written again (rewritten) to the same optical disc (DVD+RW) 1, the value of the OPC counter assigned to the DCB in the inner disc identification zone becomes "3", indicating that the number of write operations is 3.

Figure 7:
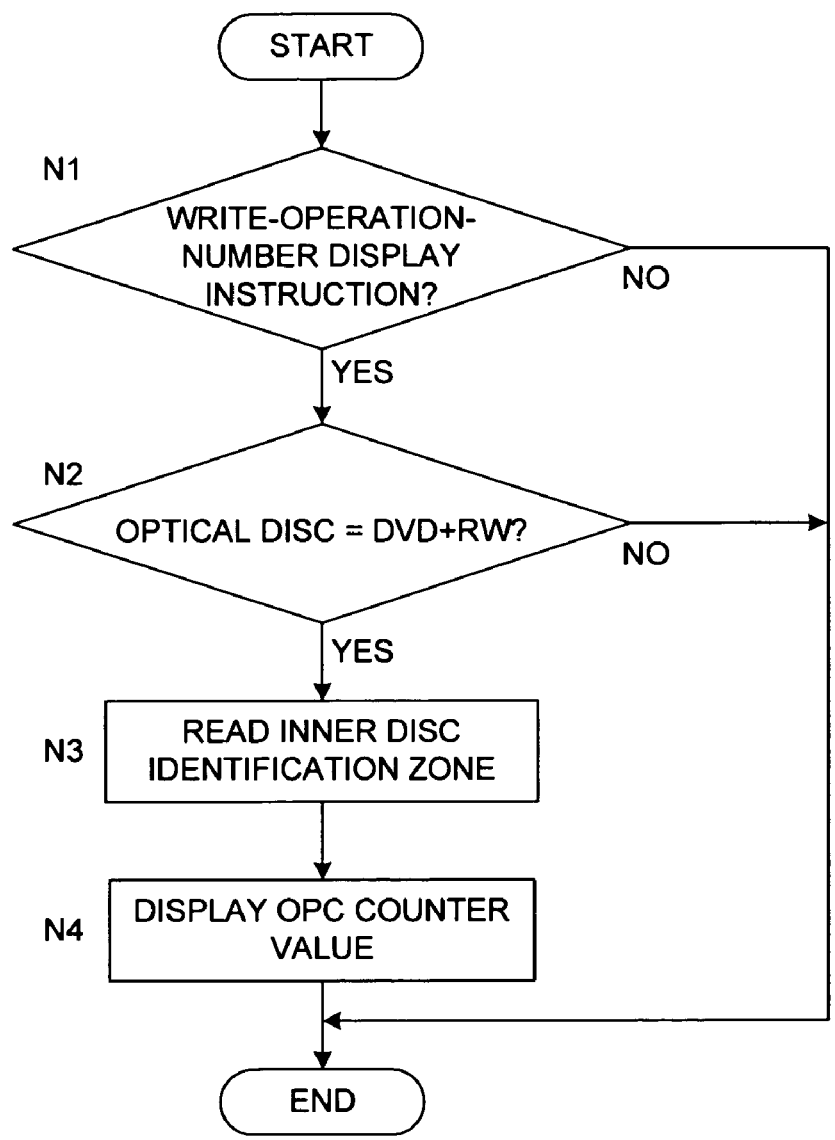
FIG. 7 is a flow chart showing the procedure performed to display the number of write operations.

FIG. 7 is a flow chart showing the procedure performed to display the number of write operations. With reference to this flow chart and FIGS. 1 to 5, the procedure performed to display the number of write operations will be described.

After the optical disc 1 is loaded, the remote control 21 is operated to cause the display device 20 to display a menu screen. The system controller 22 detects whether or not a write-operation-number display instruction is received (step N1). If a write-operation-number display instruction is found to be received, the optical disc 1 is checked whether or not it is a DVD+RW based on the disc information (step N2). If the optical disc 1 is found to be a DVD+RW, the counter value reading means 225 of the system controller 22 reads the value of the OPC counter assigned to the DCB in the inner disc identification zone of the optical disc (DVD+RW) 1 via the optical pickup 2, the RF amplifier 6, and the digital signal processing portion 8 (step N3). The write-operation-number display means 226 performs OSD (on-screen display) processing to make the display of the read OPC counter value possible, and causes the display device 20 to display the read OPC counter value via the video encoder 18 (step N4).

Assume that the OPC counter value is, for example, "965". Then, the number "965" is displayed on the display device 20 as the number of times writing has been performed to this optical disc. The display device 20 displays, for example, a message saying "WRITE OPERATION LIMIT TO THIS DISC: APPROX. 1000 TIMES. CURRENT WRITE OPERATIONS: 965 TIMES. YOU ARE APPROACHING THE LIMIT, SO PLEASE REPLACE WITH A NEW DISC". Alternatively, the display device 20 simply displays, for example, "CURRENT WRITE OPERATIONS: 965".

As described above, according to this embodiment, it is possible to display the number of times writing has been performed to a rewritable optical disc (especially a DVD+RW optical disc), making it possible to inform the user how long the optical disc lasts or when it needs replacing. That is, by displaying on a display device or the like the number of times writing has been performed to a currently used optical disc, it is possible to inform the user how long the optical disc lasts or when it needs replacing. This offers convenience for the user, and helps reduce writing error.

What is claimed is:

1. An optical disc recording/reproducing apparatus that records and reproduces information on and from an optical disc, the optical disc recording/reproducing apparatus comprising:
a system controller that
after executing optimized power control (OPC) for setting output laser light of an optical pickup to optimum power, updates a value of an OPC counter assigned to a predetermined area of the optical disc by incrementing the value of the OPC counter by 1, and
if a write-operation-number display instruction is received when information is being read from the optical disc, causes a display means to display the updated OPC counter value as a number of times writing has been performed to the optical disc.

2. The optical disc recording/reproducing apparatus of claim 1, wherein the optical disc is a DVD+RW optical disc.

3. The optical disc recording/reproducing apparatus of claim 2, wherein the system controller includes
OPC execution means for executing the OPC if the optical disc is found to be a DVD+RW,
counter value temporary saving means for temporarily saving in a memory, after the OPC is executed, the value of the OPC counter assigned to the predetermined area of the optical disc,
incrementing means for incrementing the OPC counter value temporarily saved in the memory by +1,
counter value updating means for updating, if an optical disc eject request is received after the OPC counter value temporarily saved in the memory is incremented by the incrementing means and then recording of information on the optical disc is started and then stopped, the value of the OPC counter assigned to the predetermined area of the optical disc so as to be equal to the OPC counter value temporarily saved in the memory and then incremented by the incrementing means,
counter value reading means for reading, if the optical disc is found to be a DVD+RW, upon receipt of the write-operation-number display instruction, the value of the OPC counter assigned to the predetermined area of the optical disc, and
write-operation-number display means for causing the display means to display the read OPC counter value as a number of write operations to the optical disc.

4. The optical disc recording/reproducing apparatus of claim 2, wherein
the predetermined area of the optical disc to which the OPC counter is assigned is a disc control block (DCB) in an inner disc identification zone.

5. The optical disc recording/reproducing apparatus of claim 3, wherein
the predetermined area of the optical disc to which the OPC counter is assigned is a disc control block (DCB) in an inner disc identification zone.

* * * * *